(No Model.) 2 Sheets—Sheet 1.

J. B. FORSYTH.
ENDLESS TUBING AND ART OF AND APPARATUS FOR MAKING SAME.

No. 598,919. Patented Feb. 15, 1898.

WITNESSES:

INVENTOR
James Bennet Forsyth
BY
Maynadier Fitchell
ATTORNEYS.

(No Model.) 2 Sheets—Sheet 2.
J. B. FORSYTH.
ENDLESS TUBING AND ART OF AND APPARATUS FOR MAKING SAME.
No. 598,919. Patented Feb. 15, 1898.
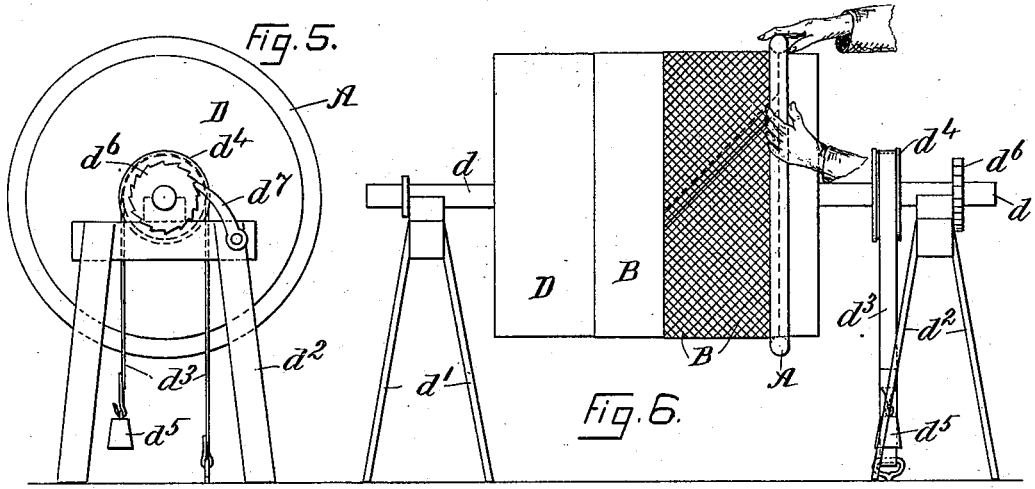
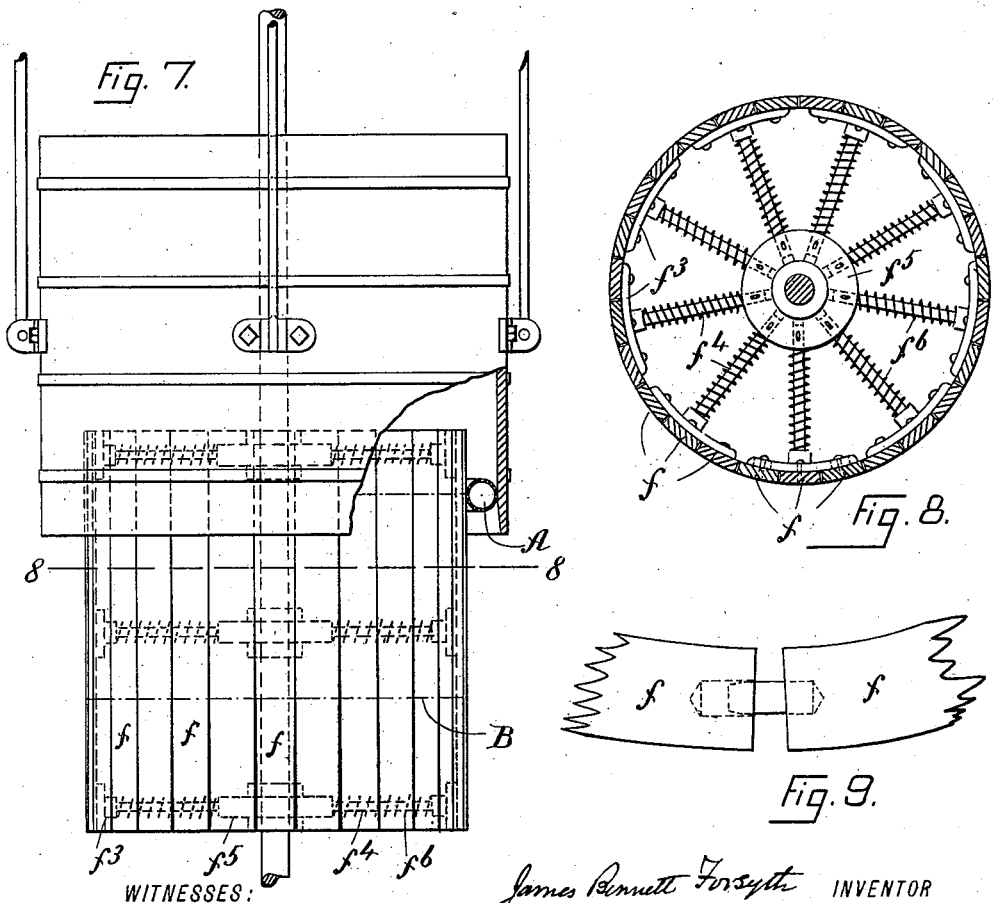
WITNESSES:
H. P. Cuillo
John R. Snow.
James Bennett Forsyth INVENTOR
BY
Maynadier & Mitchell
ATTORNEYS.

UNITED STATES PATENT OFFICE.

JAMES BENNETT FORSYTH, OF BOSTON, MASSACHUSETTS.

ENDLESS TUBING AND ART OF AND APPARATUS FOR MAKING SAME.

SPECIFICATION forming part of Letters Patent No. 598,919, dated February 15, 1898.

Application filed October 31, 1896. Serial No. 610,728. (No model.)

*To all whom it may concern:*

Be it known that I, JAMES BENNETT FORSYTH, of Boston, Massachusetts, have invented a new and useful Endless Tubing and Art of and Apparatus for Making It, of which the following is a specification, reference being had to the accompanying drawings, in which—

Figure 1:
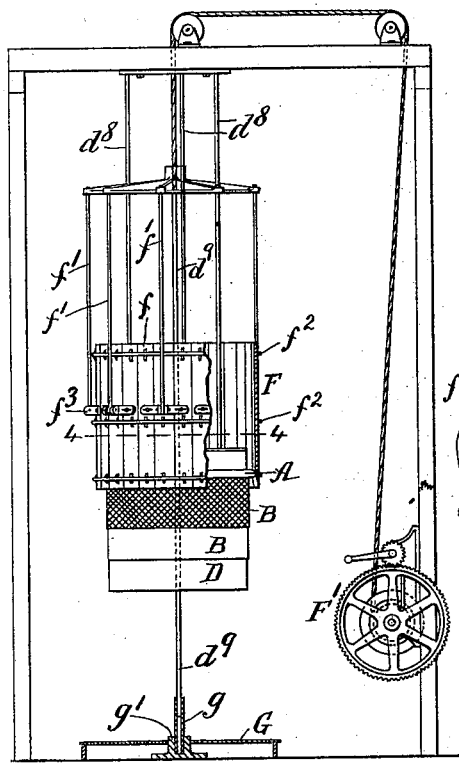
Figure 3:
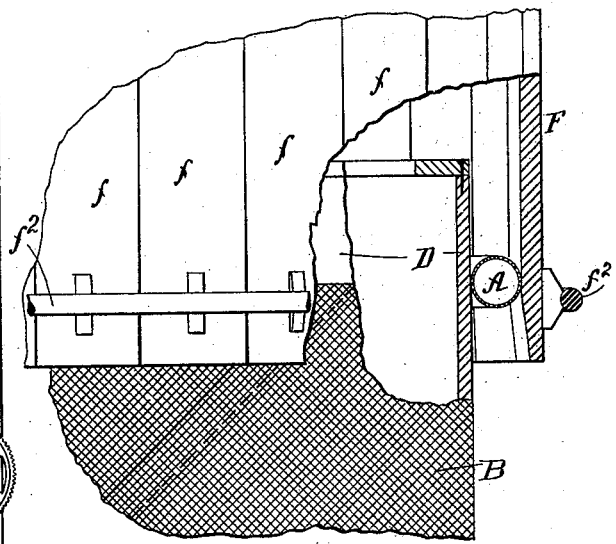
Figure 2:
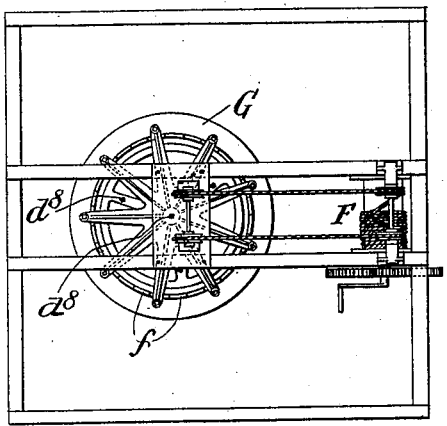
Figure 4:
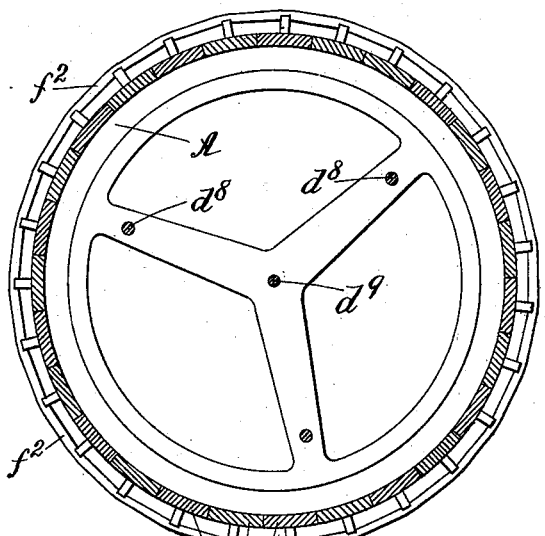

Figures 1 and 2 are an elevation and a plan of the best form of my new machine. Fig. 3 is a detail, on a large scale, partly in section. Fig. 4 is a section on line 4 4 of Fig. 1 on a larger scale than Fig. 1, but on a smaller scale than Fig. 3. Figs. 5 and 6 are an end view and elevation of the simplest form of my machine. Figs. 7, 8, and 9 show a modification in the construction of the drum and exterior cylindrical rolling device, Fig. 8 being a section on line 8 8 of Fig. 7.

My new endless tubing is adapted for pneumatic tires and other purposes; and it consists of an endless lining-tube A, about which a cylinder B, of cloth and rubber or the like, is wrapped or rolled, as will be plain from the drawings, and my invention is that tubing, together with the method of and apparatus for making it.

My apparatus for making endless tubing consists, in its simplest form, of a drum D and supports for that drum such that the cylinder B can be put in place on that drum and the cylinder folded over and then pushed and rolled over upon itself along that drum to form an endless tube, (see Figs. 5 and 6,) in which the drum D is fast to the shaft $d$, and the shaft rests in open boxes upon the stands $d'$ $d^2$. In this form of my apparatus the work is done by hand, as indicated in Fig. 6, and the drum is gradually turned as the process proceeds in order that the operator may conveniently reach the entire circumference of the cylinder B. The operation is facilitated by steadying the drum D by means of the friction-brake, shown as consisting of a strap $d^3$, passing over pulley $d^4$, with weight $d^5$ at the free end of strap $d^3$ and the other end fast to the frame of the machine or to the floor. This, according to the weight attached to the brake-strap $d^3$, opposes motion of drum D in one direction, while ratchet and pawl $d^6$ $d^7$ prevent motion in the opposite direction.

As a practical matter I find that it is better in every way, both as regards cheapness of production and quality of product, to use an endless lining-tube A, inflated sufficiently to give it shape, and after the cylinder B is in place upon the drum D the tube A is placed over one end of the cylinder B, the outer surface of which is cemented, and the tube A is rolled along the cylinder B, which is thus wrapped about tube A. The surface of cylinder B is cemented, so as to hold the completed tube in its rolled shape, as above described, and the tube thus formed is then vulcanized, the lining-tube A being of rubber compound and the cover-cylinder being partly of rubber compound and cloth and partly of rubber compound, as will be plain to all skilled in the making of endless tubing for bicycle-tires and other purposes.

When the tube A is to be rolled along over the cylinder B by hand, I prefer to mount the drum D on a horizontal axis, as in Figs. 5 and 6; but where a mechanical device is to be used for rolling tube A upon cylinder B, I prefer that the axis of the drum should be vertical.

In Figs. 1, 2, 3, and 4 a mechanical device for rolling the tube A along the cover-cylinder B is shown, consisting of a cylinder F, composed of staves $f$ in sets of three, the middle one of them being connected to rod $f'$ and the outer ones by means of a pin and slot to a cross-piece fast to that rod $f'$, so that each stave $f$ can move slightly with relation to the other. All the staves are forced together by means of the contractile hoops or bands $f^2$, of rubber or other suitable material. The mouth of the cylinder F is enlarged, as shown in Figs. 1 and 3, so that when cylinder F is lowered its mouth will encompass tube A, and as cylinder F is lowered still more the interior of cylinder F will press upon tube A and thus roll tube A upon the cover-cylinder B on drum D, thereby wrapping cover-cylinder B about tube A, the staves $f$ of exterior cylinder F yielding as the endless tube formed from tube A and cover-cylinder B increases in cross-section. When exterior cylinder F is lowered far enough, the endless tube, composed of cover-cylinder B, wrapped about tube A, will have rolled off of the lower end of drum D, and as soon as it rolls off it will fall upon the platform G. The attendant then lifts sleeve $g$ out of its socket $g'$ and removes the tire from the platform G.

Drum D is supported by the three rods $d^8$ and is steadied by the rod $d^9$, which is connected at its lower end by sleeve $g$ with socket $g'$.

Exterior cylinder F is raised by the windlass F', as will be clear from Figs. 1 and 2.

In Figs. 7, 8, and 9 the exterior cylinder F is composed of staves and hoops and the drum D is made yielding by means of staves $f$, in sets of three, the middle one fast to cross-piece $f^3$ on the end of spoke $f^4$, which is pressed away from its hub $f^5$ by the spring $f^6$, and the two outer staves of each set of three are connected to cross-piece $f^3$ by a slot and pin. The drum D in this case becomes smaller as the tire increases in cross-section. The staves $f$ are preferably doweled at their edges, as indicated in Fig. 9.

What I claim is—

1. The method of forming an endless and seamless tube by rolling an inflated endless tube on a cover-cylinder whereby the cover-cylinder is rolled into an outer endless and seamless tube on the inflated endless tube as a core substantially as described.

2. The apparatus above described comprising a drum and an exterior cylinder, with means to move the drum and cylinder endwise in relation one to the other, to wrap cover-cylinder B about lining-tube A, substantially as described.

3. The article above described made up of the inner endless tube A and the cover-cylinder B wrapped about it to form an outer endless and seamless tube both tubes being of vulcanizable compound in whole or in part and vulcanized to form a single endless and seamless tube substantially such as is above described.

JAMES BENNETT FORSYTH.

Witnesses:
J. E. MAYNADIER,
JOHN R. SNOW.